Patented Dec. 12, 1944

2,365,121

UNITED STATES PATENT OFFICE 2,365,121

REFINING OF PHENOLIC RESINS Zn-NaHSO₄ MIXTURE

William N. Traylor, Hattiesburg, Miss., assignor to Hercules Powder Company, Wilmington, Del., a corporation of Delaware No Drawing. Application April 18, 1941, Serial No. 389,173

15 Claims. (Cl. 260—19)

This invention relates to phenol-aldehyde resins, and more particularly to a process for refining phenol-aldehyde resins.

The production of pale colored phenol-aldehyde resins and their modification products has been difficult and expensive. Moreover, the known processes for refining phenol-aldehyde resins are generally concerned with color stabilization while there has been need for a simple and economical method of refining dark colored phenol-aldehyde resins to produce the paler resins.

It is an object of this invention to provide an improved process for refining phenol-aldehyde resins.

It is a further object of this invention to provide an improved process for refining phenol-aldehyde resins which is extremely simple and economical.

A further object of this invention is to provide a process for refining phenol-aldehyde resins which will effect a substantial decrease in the color of the phenol-aldehyde resin.

It is a still further object of this invention to provide a process for refining phenol-aldehyde resins which will provide a refined product in a substantially quantitative yield based on the resin treated.

Other objects of the invention will appear hereinafter.

The objects of the invention, in general, are accomplished by treating phenol-aldehyde resins with nascent hydrogen. The treatment is carried out under conditions which will provide intimate contact between the phenol-aldehyde resins and the nascent hydrogen. As a result, the color of the phenol-aldehyde resins becomes substantially lightened.

In accordance with the process of this invention the treatment may be carried out on the phenol-aldehyde resins in the molten condition or on phenol-aldehyde resins dissolved in a suitable solvent. After the treatment of the phenol-aldehyde resins is completed, the resins or their solution may be washed to remove any water-soluble material and filtered to remove any suspended matter. If desired, the solution may be filtered prior to the washing step. In the case of treatment of the phenol-aldehyde resins in solution, the resins of improved color may then be recovered by evaporation of the solvent.

The process of this invention is applicable to the phenol-aldehyde resins which are soluble in a suitable solvent or fusible under the conditions of this process. This class of resins includes any of the soluble-fusible resins made by reaction of phenol, a substituted phenol or a polyvalent phenol or their mixtures with formaldehyde, homologues of formaldehyde or other aldehydes as acetaldehyde, butyraldehyde, etc., and also includes the soluble-fusible modified phenol-aldehyde resins, particularly the rosin and drying oil modified phenol-aldehyde resins. For example, the resins suitable for refining according to this process may be those formed from phenols such as phenol, cresols, xylenols, resorcinol, pyrocatechol, salicylic acid, chlorinated phenolic compounds, etc., and aldehydes such as formaldehyde, acetaldehyde, acrolein, crotonaldehyde, benzaldehyde, furfural, etc., and the modification products of these straight phenol-aldehyde resins with rosin or polymerized rosin or their esters or with tung oil, linseed oil, etc., or with phenol-aldehyde resins modified with mixtures of such modifying agents. The refining treatment may be applied desirably to the resin immediately after its preparation.

It will be understood that by "soluble-fusible phenol-aldehyde resins" is meant phenol-aldehyde resins capable of being dissolved in a suitable solvent or of being in the molten state under the conditions of the process of this invention. Thus, the term "soluble-fusible phenol aldehyde resins" includes phenol-aldehyde resins which may on further treatment readily become infusible and insoluble provided that the resins prior to such treatment fulfill the requirements of solubility or fusibility.

As solvents for the phenol-aldehyde resins where the treatment is carried out on the resins in solution, any solvent for the phenol-aldehyde resins which is itself inert in the treatment may be employed. Among such solvents are, for example, mono-cyclic aromatic hydrocarbons, such as benzene, toluene, xylene, etc.; petroleum hydrocarbons, such as gasoline, V. M. and P. naphtha, hexane, heptane, etc.; hydrogenated petroleum hydrocarbons, such as those known in the trade as "Solvesso" solvents; turpentine, terpenes, and solvents such as ethylene dichloride, carbon tetrachloride, dichloroethyl ether, cyclohexane, methyl-cyclohexane, p-menthane, tetrahydro and decahydronaphthalenes, etc. Where the treatment is carried out on the phenol-aldehyde resins in solution, the concentration of the resins in solution is not critical and may be selected so as to provide adequate workability of the solution. In general, a concentration within the range of about 10% to about 75% by weight may be used, but preferably the concentration is held within the range of about 30% to 50% by weight.

The nascent hydrogen for use in the treatment of the phenol-aldehyde resins in accordance with this invention may be derived by any of the well-known procedures for generating nascent hydrogen. Preferably, the nascent hydrogen may be provided by the reaction of an acid reactant with a metal above hydrogen in the electromotive series. The acid reactant may be either an acid or an acid salt or a mixture thereof, and is employed under ionizing conditions, as for example, in aqueous solution. Among the acid reactants which may be used are, for example, hydrochloric acid, sulfuric acid, phosphoric acid, acetic acid, sodium acid sulfate, potassium acid sulfate, monosodium acid phosphate, calcium acid phosphate, etc. The preferred acid reactants are the acid salts, sodium acid sulfate being particularly effective.

Any of the metals above hydrogen in the electromotive series may be employed. It will be preferable, however, to use such metals which form salts having no appreciable discoloring action on the phenol-aldehyde resins. The metals are used preferably though not necessarily in a finely divided form. Use of metals such as, for example, cadmium, aluminum, manganese, tin, and zinc is very desirable. Zinc in the form of zinc dust, mossy zinc, or zinc powder is particularly well adapted to the process. It will be desirable that at least a small amount of water or of some other ionizing solvent be present to accelerate the refining action. Use of an aqueous acid or of the hydrate of an acid salt will provide the desired ionizing effect. It will be understood that the acid reactant and the metal are both in contact with the phenol-aldehyde resins during the treatment.

The nascent hydrogen may likewise be produced electrolytically. When using nascent hydrogen produced by electrolysis the phenol-aldehyde resins dissolved in a solvent may, for example, be placed in a suitable electrolytic cell, an acid solution or an aqueous salt solution may then be added to provide ionization and a direct current may then be passed through the cell for a length of time dependent on the current and the degree of refining desired.

It is desirable to employ vigorous agitation in carrying out the treatment to obtain thorough contact of the reactants and to accelerate the refining action. The speed with which the phenol-aldehyde resins become refined is also dependent on the temperature employed in the treatment. While the treatment may be carried out at room temperature with the phenol-aldehyde resins dissolved in a suitable solvent, the rate of refining is rather slow for practical purposes. It is preferable to carry out the treatment at elevated temperatures and temperatures as high as 200° C. have been found to be satisfactory although higher temperatures are possible. A temperature within the range of about 70° C. to about 125° C. is preferable. When carrying out the treatment of the phenol-aldehyde resins in solution, it is convenient to carry out the treatment at the reflux temperature of the solvent. Where the treatment is to be carried out above the normal boiling point of the solvent, use of superatmospheric pressure is resorted to. The pressures employed are in no way limiting on the process, and the equipment employed will generally determine the maximum pressure which is practical.

The time of treatment of the phenol-aldehyde resins may be varied to produce the result desired. The time necessary to provide satisfactory refining of the resins will be dependent on such factors as the amount of color bodies present in the phenol-aldehyde resins, the temperature of treatment, the amount of nascent hydrogen utilized, etc. For this reason, it is impossible to state any definite time necessary, except in relation to a given set of conditions. Under usual conditions reaction times between about 10 minutes and 5 hours may be satisfactory, although depending on specific conditions, longer or shorter contact times are entirely possible.

The amount of acid reactant used for producing nascent hydrogen, when this method of generating nascent hydrogen is employed, may vary over a wide range, depending on such factors as the particular acid reactant used, the degree of refining desired, the particular conditions of treatment, as well as other factors. Assuming the acid reactant to be on an anhydrous basis, ratios of phenol-aldehyde resins to acid reactant as high as 40 to 1 on a weight basis have been used. In general, however, ratios varying between 10 of phenol-aldehyde resin to 1 of acid reactant down to 1 of phenol-aldehyde resin to 1 of acid reactant are desirable. A preferred ratio is approximately 3 of phenol-aldehyde resin to 1 of acid reactant.

The concentration of the acid reactant in terms of ionizing solvent may also be widely varied. For example, sulfuric acid may be used as the acid reactant in concentration of from 3% to 95% in aqueous solution, while acetic acid may be used in the substantially anhydrous form of glacial acetic acid. When acids are used as the acid reactants, however, concentrations of acid of 20 to 50% are generally preferable. When using acid salts as acid reactants, either a hydrate, or an aqueous solution from concentrations of about 5% by weight to a saturated solution may be employed. The monohydrate of sodium acid sulfate, for example, is a particularly effective acid reactant in the process according to the invention.

The amount of metal above hydrogen in the electromotive series which is employed is not particularly critical. It will be preferable, however, to have such an amount of metal present which will be an excess over the theoretical amount required to react with the acid reagent present.

The process of refining phenol-aldehyde resins in accordance with this invention may also be carried out as a continuous process if desired. Thus, for example, the phenol-aldehyde resin solution may be treated with the acid reactant and the metal above hydrogen in the electromotive series in a suitable vessel while additional phenol-aldehyde resin solution is fed into the vessel continuously and refined phenol-aldehyde resin solution is withdrawn from the vessel at substantially the same rate. The acid reagent and metal may be replenished as necessary and the refined solution passed to a continuous evaporator for removal of the solvent.

The use of an inert atmosphere such as provided by nitrogen, hydrogen, carbon dioxide, etc., during the various refining steps is often of assistance in obtaining pale colors. This may be particularly helpful during washing of treated phenol-aldehyde resin solutions or in the evaporation of solvents therefrom.

As illustrative of the improved process of refining phenol-aldehyde resin in accordance with this invention, the examples appearing below are cited as typical of the various embodiments. The colors shown in the examples are those corresponding to the Standard U. S. rosin type.

EXAMPLE I

Phenol-aldehyde resins of several types were separately refined with different treating agents according to the process of this invention. A solution of 60 parts by weight of the resin dissolved in 190 parts by weight of the solvent was refluxed for one hour with the parts by weight of treating agent shown in the table. Each treated solution after cooling was decanted, washed with water, filtered to remove metal remaining, and the resin then recovered by distilling off the solvent in vacuo. There was no loss of material in the treatment.

for ½ hour. The reaction mixture was diluted with an equal weight of toluene.

Two hundred grams of the toluene solution was refluxed for ¾ hour with 40 g. zinc powder and 70 g. $NaHSO_4 \cdot H_2O$. The solution was decanted from the solid matter, filtered, water washed, and dried with anhydrous $Na_2SO_4$. The original solution had a color of 7 on the Hellige scale. The bleached solution had a color of 3 on the Hellige scale.

It is to be understood that the term "refining" used throughout this invention refers particularly to the color improvement of the resin, and not necessarily to a separation of the resin into light colored and dark colored fractions.

It will also be understood that the details and

*Treating agent, parts by weight*

| Type resin | Solvent | Metal | Acid | Original color | Treated color |
|---|---|---|---|---|---|
| A | Benzene | 20 pts. Zn | 30 pts. $NaHSO_4 \cdot H_2O$ | Brown-black | I |
| B | do | do | do | G | H |
| B | do | do | do | H | I+ |
| B | do | do | do | D | G |
| B | do | 20 pts. Sn | 60 pts. 10% aqueous HCl | D | H |
| B | Ethylene dichloride | 20 pts. Zn | 60 pts. $NaHSO_4 \cdot H_2O$ | D | F |
| B | Benzene | do | 30 pts. glacial acetic acid | D | G |
| B | do | do | 60 pts. 40% aqueous $H_2SO_4$ | D | G |
| C | do | do | 35 pts. 50% aqueous $H_2SO_4$ | Brown-black | D |
| C | do | do | 60 pts. 10% aqueous HCl | do | D |

Resin types refined:
A. Commercial unmodified cresol-formaldehyde condensate
B. Commercial ester gum modified phenol-formaldehyde resin
C. Commercial furfural-phenol resin

EXAMPLE II

An ester gum modified phenol-formaldehyde resin was prepared by heating together 3 mols of phenol, 2 mols of ortho and para cresols and 6 mols of formaldehyde in a 40% solution. The mixture was heated for five hours at 140° C., the materials condensing to form a water-insoluble resin. 150 parts by weight of this resin was mixed with 850 parts by weight of WW gum rosin and 95 parts by weight of glycerin. This mixture was heated to 270° C. and maintained at this temperature for 6½ hours in an atmosphere of $CO_2$, then sparged at 270° C. with $CO_2$ for 45 minutes. A resin was formed having a color of grade D, an acid number of 11, and a drop melting point of 126° C.

Sixty parts by weight of this ester gum modified phenol-aldehyde resin was dissolved in 190 parts by weight of benzene and refluxed for 1 hour with a mixture of 20 parts by weight of zinc powder and 30 parts by weight of sodium acid sulfate mono-hydrate. The refined resin was recovered by separating the benzene solution from the bleaching agent, water washing and evaporating the solvent from the refined resin by vacuum distillation. The refined ester gum modified phenol-aldehyde resin was improved from a color of D to I. The drop melting point and acid number were unchanged.

EXAMPLE III

One hundred parts of phenol, 100 parts of linseed oil and 1 part of 75% $H_3PO_4$ were heated to 150° C. for 7 hours in a $CO_2$ atmosphere. The homogeneous reaction mixture was cooled to 100° C. and 30 parts of trioxymethylene was added. The mixture was heated at 100–120° C. for a period of 1 hour. 500 parts of linseed oil was added, and the mixture then heated to 260° C.

examples hereinbefore set forth are illustrative only, and that the invention as broadly described and claimed is in no way limited thereby.

What I claim and desire to protect by Letters Patent is:

1. A process for refining a soluble-fusible phenol-aldehyde resin which comprises treating said soluble-fusible phenol-aldehyde resin dissolved in a suitable solvent with nascent hydrogen formed by the reaction of an acidic reactant containing ionizable hydrogen and a metal above hydrogen in the electromotive series in contact with said soluble-fusible phenol-aldehyde resin, and in the presence of at least a small amount of water.

2. A process for refining a soluble-fusible phenol-aldehyde resin which comprises treating said soluble-fusible phenol-aldehyde resin dissolved in a suitable solvent with nascent hydrogen formed by the reaction of an acidic reactant and a metal above hydrogen in the electromotive series in contact with said soluble-fusible phenol-aldehyde resin solution, and in the presence of at least a small amount of water.

3. A process for refining a soluble-fusible phenol-aldehyde resin which comprises treating said soluble-fusible phenol-aldehyde resin dissolved in a suitable solvent with nascent hydrogen formed by the reaction of a metal above hydrogen in the electromotive series and an acid salt in contact with said soluble-fusible phenol-aldehyde resin solution, and in the presence of at least a small amount of water.

4. A process for refining a soluble-fusible phenol-aldehyde resin which comprises treating said soluble-fusible phenol-aldehyde resin dissolved in a suitable solvent with nascent hydrogen formed by the reaction of sodium acid sulfate and a metal above hydrogen in the electromotive series in contact with said soluble-fusible phenol-aldehyde resin solution, and in the presence of at least a small amount of water.

5. A process for refining a soluble-fusible phenol-aldehyde resin which comprises treating said soluble-fusible phenol-aldehyde resin dissolved in a suitable solvent with nascent hydrogen formed by the reaction of an acidic reactant and zinc in contact with said phenol-aldehyde resin solution, and in the presence of at least a small amount of water.

6. A process for refining a soluble-fusible phenol-aldehyde resin which comprises treating said soluble-fusible phenol-aldehyde resin dissolved in a suitable solvent with nascent hydrogen formed by the reaction of sodium acid sulfate and zinc in contact with said soluble-fusible phenol-aldehyde resin solution.

7. A process for refining a soluble-fusible phenol-aldehyde resin which comprises treating said soluble-fusible phenol-aldehyde resin dissolved in a suitable solvent with nascent hydrogen formed by the reaction of zinc and sodium acid sulfate monohydrate in contact with said soluble-fusible phenol-aldehyde resin solution.

8. A process for refining a soluble-fusible phenol-aldehyde resin which comprises treating said soluble-fusible phenol-aldehyde resin dissolved in a suitable solvent with nascent hydrogen formed by the reaction of an acidic reactant and a metal above hydrogen in the electromotive series in contact with said soluble-fusible phenol-aldehyde resin solution, at a temperature within the range of about 70° to about 125° C.

9. A process for refining a soluble-fusible phenol-aldehyde resin which comprises treating said soluble-fusible phenol-aldehyde resin dissolved in a suitable solvent with nascent hydrogen formed by the reaction of sodium acid sulfate monohydrate and zinc in contact with said soluble-fusible phenol-aldehyde resin solution at a temperature within the range of about 70° to about 125° C.

10. A process for refining a soluble-fusible unmodified phenol-aldehyde resin which comprises treating said resin dissolved in a suitable solvent with nascent hydrogen formed by the reaction of an acidic reactant and a metal above hydrogen in the electromotive series in contact with said unmodified phenol-aldehyde resin solution.

11. A process for refining a soluble-fusible unmodified phenol-aldehyde resin which comprises treating said resin dissolved in a suitable solvent with nascent hydrogen formed by the reaction of zinc and sodium acid sulfate monohydrate in contact with said unmodified phenol-aldehyde resin solution at a temperature within the range of about 70° to about 125° C.

12. A process for refining a soluble-fusible rosin ester modified phenol-aldehyde resin which comprises treating said resin dissolved in a suitable solvent with nascent hydrogen formed by the reaction of an acidic reactant and a metal above hydrogen in the electromotive series in contact with said soluble-fusible rosin ester modified phenol-aldehyde resin solution.

13. A process for refining a soluble-fusible rosin ester modified phenol-aldehyde resin which comprises treating said resin dissolved in a suitable solvent with nascent hydrogen formed by the reaction of sodium acid sulfate monohydrate and zinc in contact with said rosin ester modified phenol-aldehyde resin solution at a temperature within the range of about 70° to about 125° C.

14. A process for refining a soluble-fusible drying oil modified phenol-aldehyde resin which comprises treating said resin dissolved in a suitable solvent with nascent hydrogen formed by the reaction of an acidic reactant and a metal above hydrogen in the electromotive series in contact with said soluble-fusible drying oil modified phenol-aldehyde resin solution.

15. A process for refining a soluble-fusible drying oil modified phenol-aldehyde resin which comprises treating said resin dissolved in a suitable solvent with nascent hydrogen formed by the reaction of sodium acid sulfate monohydrate and zinc in contact with said drying oil modified phenol-aldehyde resin solution at a temperature within the range of about 70° to about 125° C.

WILLIAM N. TRAYLOR.